Dec. 10, 1929.　　　R. G. NICHOLAS　　　1,739,177
LIGHT SHIELD
Filed Oct. 27, 1927
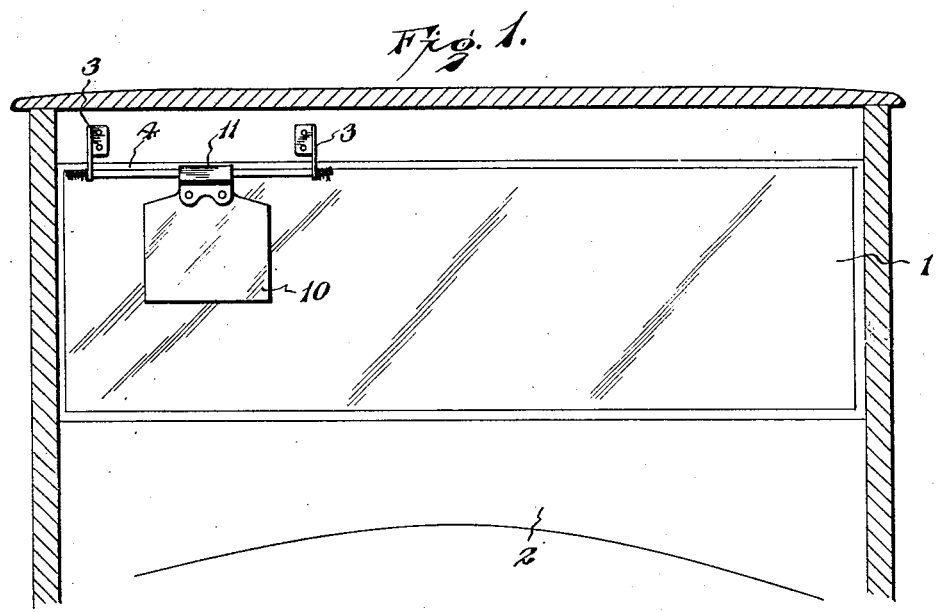
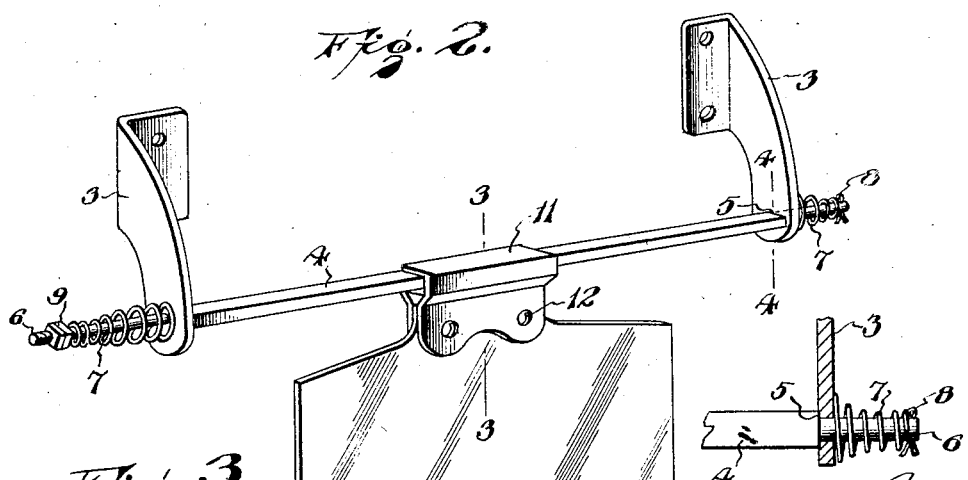
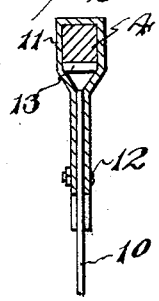
Inventor
R. G. Nicholas
By Lacey & Lacey, Attorneys Patented Dec. 10, 1929

1,739,177

UNITED STATES PATENT OFFICE

ROBERT GRANT NICHOLAS, OF LINCOLN, NEBRASKA

LIGHT SHIELD

Application filed October 27, 1927. Serial No. 229,166.

This invention relates to means for shielding the eyes of vehicle drivers so that they may at all times clearly observe the road and drive with safety.

The invention furnishes a shield which is associated with the usual windshield of motor vehicles and adjustable laterally and vertically, to meet various requirements to the end that the eyes may be protected against the glare of bright lights or sunshine.

While the drawing illustrates a preferred embodiment of the invention, it is to be understood that in adapting the means to meet specific needs and requirements, the design may be varied and such other changes in the minor details of construction may be resorted to within the scope of the invention as claimed without departing from the spirit thereof.

For a full understanding of the invention and the merits thereof, reference is to be had to the following description and the drawing hereto attached, in which,—

Figure 1 is a front view of a windshield and front of a vehicle provided with an anti-glare device embodying the invention.

Figure 2 is a perspective view of the device showing the parts on a larger scale.

Figure 3 is a detail sectional view on the line 3—3 of Figure 2.

Figure 4 is a detail sectional view on the line 4—4 of Figure 2.

Corresponding and like parts are referred to in the following description and designated in the several views of the drawing by like reference characters.

The numeral 1 designates a windshield and 2 the front of the vehicle. These parts may be of any construction and arrangement and are illustrated to demonstrate the application of the invention. Brackets 3 are secured to the front of the vehicle in any determinate way and are located at the top of the windshield, and pivotally support a transversely disposed bar 4. End portions of the bar 4 are reduced and of cylindrical form and pass through openings formed in the ends of the brackets 3. The shoulder 5 formed at the inner end of each of the reduced ends 6 of the bar 4 engages the inner side of a bracket. A coil spring 7 is mounted upon each of the reduced ends 6 and is located exterior to the brackets with its inner end exerting a pressure against the outer side of the bracket so as to hold the bar 4 and shield carried thereby in the required adjusted position. A pin 8 applied to the outer end of the part 6 confines the spring 7. The opposite reduced end 6 of the bar 4 is threaded and receives nuts 9, one of which is for adjustment and the other operating as a lock to hold the adjusting nut in position. The bar 4 is of non-circular outline in cross section and is preferably of square form.

The numeral 10 designates the shield which consists of a plate of transparent material, such as celluloid and which is colored to soften a glaring light. A clip 11 comprises a portion embracing the bar 4 and part embracing the shield 10 which is secured therebetween by means of bolts or other suitable fastenings 12. That part of the clip 11 embracing the bar 4 conforms thereto in outline, as indicated most clearly in Figure 3 to prevent turning of the clip upon the bar. While the clip 11 is prevented from turning on the bar 4 it nevertheless is adapted to slide thereon so as to be adjusted to any required position within the length of the bar 4 to suit the driver. A strip of felt 13 is confined within that part of the clip receiving the bar 4 and serves to prevent rattle and to frictionally engage the bar to hold the clip and shield in the required adjusted position in the length of the bar.

The primary object of the shield 10 is to provide a visor or projection to prevent the glare from interfering with the vision of the driver. Inasmuch as the shield 10 is transparent it is obvious that it may be adjusted to occupy a position between the source of light and the eyes of the driver to soften the light and prevent any blinding glare from obstructing the vision. The shield is adjustable in the length of the windshield by being movable along the length of the bar 4, and is angularly adjustable with the bar 4 when the latter is turned about its reduced ends 6, as pivots. The friction exerted by the springs 7 against the brackets 3 holds the shield in any pivoted adjustment, as will be readily comprehended. When not required for use the shield may be thrown upward so as to be out of the way.

Having thus described the invention, I claim:

An anti-glare device comprising a shaft non-circular in cross section throughout substantially its entire length and having its ends reduced to form pintles and shoulders at the inner ends of the pintles, brackets adapted to be secured to a support and formed with openings rotatably receiving said pintles, springs coiled about said pintles and at their inner ends bearing against said brackets to hold the brackets against said shoulders, removable abutments carried by said pintles and engaging the outer ends of the springs, the abutment of one pintle consisting of nuts screwed thereon and when adjusted adapted to regulate tension of the springs, a transparent plate constituting a shield, and a clip having a tubular sleeve fitting snugly upon said shaft and slidable longitudinally thereon and held against turning about the shaft, and arms extending from said sleeve and firmly secured against opposite faces of the shield.

In testimony whereof I affix my signature.

ROBERT G. NICHOLAS. [L. S.]